US007831740B2

(12) United States Patent
Kim et al.

(10) Patent No.: US 7,831,740 B2
(45) Date of Patent: Nov. 9, 2010

(54) METHOD AND CIRCUIT FOR PROGRAMMING ELECTRONIC DEVICES

(75) Inventors: Min-Su Kim, Gyeonggi-do (KR); Sang-ha Hwang, Gyeonggi-do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 794 days.

(21) Appl. No.: 10/730,960

(22) Filed: Dec. 9, 2003

(65) Prior Publication Data

US 2004/0181789 A1 Sep. 16, 2004

(30) Foreign Application Priority Data

Mar. 10, 2003 (KR) ...................... 10-2003-0014778

(51) Int. Cl.
*G06F 15/00* (2006.01)
*G06F 3/00* (2006.01)
*G06F 9/44* (2006.01)

(52) U.S. Cl. ............................ 710/5; 345/501; 710/15; 717/168

(58) Field of Classification Search ......... 345/204–215, 345/501, 519–520, 690–699; 710/1–74; 717/168, 171–173
See application file for complete search history.

(56) References Cited

U.S. PATENT DOCUMENTS 5,261,055 A 11/1993 Moran et al. ................ 395/275
5,968,141 A * 10/1999 Tsai ............................ 710/14
6,028,445 A * 2/2000 Lawman ...................... 326/38
6,035,346 A 3/2000 Chieng et al. ................. 710/10
6,295,053 B1 9/2001 Tsai et al. ................... 345/204
6,507,881 B1 * 1/2003 Chen .......................... 710/305
6,839,774 B1 * 1/2005 Ahn et al. ..................... 710/14
6,910,109 B2 * 6/2005 Holman et al. .............. 711/156

FOREIGN PATENT DOCUMENTS

| | | |
|---|---|---|
| DE | 10052877 A1 | 8/2001 |
| JP | 63-237143 | 10/1988 |
| JP | 08305561 | 11/1996 |
| JP | 11338687 | 12/1999 |
| JP | 2001101004 | 4/2001 |
| JP | 2001346234 | 12/2001 |

OTHER PUBLICATIONS

European Search Report corresponding to EP 04 25 1297; mailed on Jun. 11, 2004.

* cited by examiner

*Primary Examiner*—Niketa I Patel
*Assistant Examiner*—Richard Franklin
(74) *Attorney, Agent, or Firm*—Myers Bigel Sibley & Sajovec, PA

(57) ABSTRACT

A control circuit used to transfer data to a programmable memory in an electronic device can be separate from a general operation processor circuit that controls general operations of the electronic device. The controller circuit may allow a transfer of data to the programmable memory without the use of Random Access Memory (RAM) or a Read Only Memory (ROM) that is under the control of the general operation processor circuit. The general operation processor circuit can be disabled by the controller circuit while data is transferred (i.e. programmed to) programmable memory.

11 Claims, 4 Drawing Sheets

METHOD AND CIRCUIT FOR PROGRAMMING ELECTRONIC DEVICES

CLAIM FOR PRIORITY

This application claims the priority of Korean Patent Application No. 2003-0014778 filed Mar. 10, 2003, in the Korean Intellectual Property Office, the disclosure of which is incorporated herein in its entirety by reference.

FIELD OF THE INVENTION

The invention relates generally to the field of electronics, and more particularly to methods, devices, and data structures for programming electronic devices.

BACKGROUND

Electronic devices, such as monitors, printers, cell phones, and the like may have the capability to provide functions, such as a user interface for the electronic device, through operation of a computer program (i.e., software). The software can be stored internal to the electronic device in a non-volatile memory, such as a programmable memory. For example, it is known to provide a user interface that allows a user to select settings, such as brightness, for the computer monitor under the control of the software stored in an internal programmable memory. In some systems, the operation of the electronic device can be changed by programming the programmable memory with new software.

In some systems, preliminary steps may be taken prior to reprogramming the programmable memory. For example, in some monitors switches and/or jumpers included in the monitor are set to predetermined positions to enable the programming of the programmable memory. Furthermore, in some approaches, the external casing of the monitor is removed so that the switches and jumpers (located inside the monitor) can be accessed. Moreover, the programmable memory may only be accessible via a socket located inside of the monitor. Therefore, in order to program the programmable memory in the monitor, the external casing of the monitor is removed, the jumpers set to the appropriate positions, and an external programmer (coupled to the programmable memory via the socket) programs the programmable memory.

In some monitors, it is known to access an internal programmable memory via a Video Graphics Adapter (VGA) interface. Signal lines, such as $V_{sync}$, $H_{sync}$, SDA, and SCL included in the standard VGA interface, can be used to transfer data that is to be written to the programmable memory.

Typically, the data to be written into the programmable memory is transferred from outside the monitor to a processor circuit within the monitor which, in-turn, stores the data in a Random Access Memory (RAM). The processor circuit may then convert the data in the RAM to a different format (i.e., one that may be used to write the data into the programmable memory) using a conversion program stored in a Read Only Memory (ROM). Once the data is reformatted, the reformatted data may be written into the programmable memory by the processor circuit to provide, for example, a new user interface for the monitor. Programmable control of monitors is also discussed, for example, in U.S. Pat. No. 6,295,053 to Tsai et al, the disclosure of which is incorporated herein by reference.

SUMMARY

Embodiments according to the invention can provide controller circuits that may allow data to be written to a programmable memory in an electronic device. In particular, the controller circuit can be separate from a general operation processor circuit that controls general operations of the electronic device. Furthermore, the controller circuit may allow a transfer of data to the programmable memory without the use of Random Access Memory (RAM) or a Read Only Memory (ROM) that is under the control of the general operation processor circuit. Moreover, in some embodiments according to the invention, the general operation processor circuit can be disabled by the controller circuit while data is transferred (i.e. programmed to) programmable memory. Avoiding the use of RAM and ROM may allow the controller circuit according to embodiments of the invention to be implemented at a lower cost compared to conventional systems.

In some embodiments according to the invention, program data can be transferred from outside the electronic device to a programmable memory in the electronic device via a controller circuit that controls programming of the programmable memory in the electronic device. The controller circuit can be separate from a general operation processor circuit used to provide general operations of the electronic device subsequent to transferring the program data into the programmable memory.

In some embodiments according to the invention, the transferring can include transferring the program data without using Random Access Memory (RAM) and Read Only Memory (ROM) devices, that are separate from the controller circuit. In some embodiments according to the invention, the RAM and ROM can operate under control of the general operation processor circuit and not under the control of the controller circuit.

In some embodiments according to the invention, the transferring can include comprises transferring the program data via a Video Graphics Adapter (VGA) interface to the electronic device. In some embodiments according to the invention, the transferring can include transferring the program data via an Inter-Integrated Circuit interface to the electronic device.

In some embodiments according to the invention, the general operation processor circuit can access the program data in the programmable memory to provide the general operations of the electronic device subsequent to transferring the program data into the programmable memory. In some embodiments according to the invention, the general operation processor circuit can access separate RAM and ROM to provide general operations of the electronic device.

Some embodiments according to the invention can include preventing the general operation processor circuit from accessing the programmable memory during the transfer of program data into the programmable memory. In some embodiments according to the invention, an indication can be transmitted to outside the electronic device indicating that the transfer of program data to the programmable memory is complete. In some embodiments according to the invention, a reset can be transmitted to the controller circuit to enable the general operation processor circuit to access the program data transferred into the programmable memory.

Some embodiments according to the invention, can include preventing access of a general operation processor circuit in the electronic device to a programmable memory in the electronic device during a transfer of program data from outside the electronic device to the programmable memory to program the programmable memory. In some embodiments according to the invention, the general operation processor circuit can provide operations of the electronic device subsequent to transferring the program data to the programmable memory. In some embodiments according to the invention, the general operation processor circuit can access the program data in the programmable memory to provide the general operations of the electronic device subsequent to transferring the program data into the programmable memory.

In some embodiments according to the invention, program data can be transferred from outside the electronic device to a controller circuit inside the electronic device that is separate from the general operation processor circuit whereupon the program data can be programmed into the programmable memory.

Some embodiments according to the invention can include preventing a general operation processor circuit in the electronic device used to control general operations of the electronic device from accessing a programmable memory in the electronic device. Data can be transferred from outside the electronic device to a controller circuit inside the electronic device that is separate from the general operation processor circuit whereupon the program data can be programmed into the programmable memory.

In some embodiments according to the invention, an indication can be transmitted to outside the electronic device indicating that the programming of the program data is complete. In some embodiments according to the invention, a reset can be transmitted to the controller circuit to enable the general operation processor circuit to access the program data programmed into the programmable memory to provide general operations of the electronic device. In some embodiments according to the invention, providing address information that is configured to identify an address in the programmable memory can be avoided during programming the programmable memory.

Some embodiments according to the invention, can include providing head data to the electronic device that can be configured to include information to identify data included in other fields associated with the head data as data for programming into a programmable memory. Command data associated with the head data can be provided that can be configured to include a programming operation to be carried out in the programmable memory using associated data. Data associated with the command head data can be configured to include data to be programmed into the programmable memory according to the command, wherein address information used to program the programmable memory is absent from the data.

In some embodiments according to the invention, a data structure used for programming data into a programmable memory in an electronic device can include a head field configured to include information to identify data included in other fields associated with the head field as programs data for programming into a programmable memory. A command field can be associated with the head field which is configured to include a programming operation to be carried out in the programmable memory using associated data. A data field can be associated with the command field and the head field and can be configured to include data to be programmed into the programmable memory according to the command, wherein address information used to address the programmable memory is absent from the data field.

In some embodiments according to the invention, a circuit for programming a monitor can include a controller circuit configured to transfer program data from outside the monitor to a programmable memory in the monitor. The controller circuit can be separate from a general operation processor circuit used to provide general operations of the monitor subsequent to transferring the program data into the programmable memory.

In some embodiments according to the invention, the controller circuit can include a decoder circuit coupled to an interface via which the program data can be transferred to the monitor. The decoder circuit can be configured to provide a first signal responsive to determining that data received via the interface includes an address within a controller circuit address range. A programmable memory controller can be coupled to the decoder circuit and can be configured to provide at least one control signal to the programmable memory responsive to the first signal. In some embodiments according to the invention, the controller circuit can further include a buffer circuit coupled to the decoder circuit and the programmable memory and configured to provide data to/from the programmable memory.

DESCRIPTION OF EMBODIMENTS ACCORDING TO THE INVENTION

Figure 1:
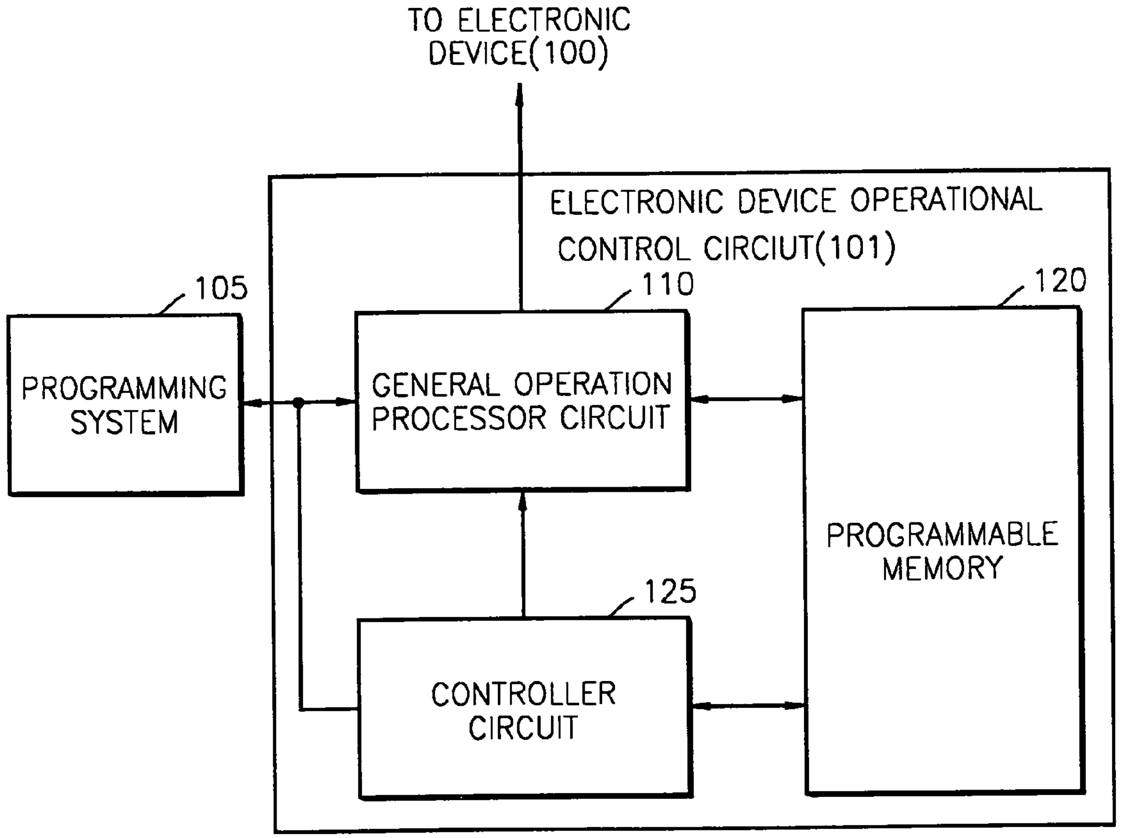
FIGS. 1 and 2 are block diagrams that illustrate embodiments according to of the invention.

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete and will fully convey the concept of the invention to those skilled in the art. Like numbers refer to like elements throughout.

The terminology used in the description of the invention herein is for the purpose of describing particular embodiments only and is not intended to be limiting of the invention. As used in the description of the invention and the appended claims, the singular forms “a”, “an” and “the” are intended to include the plural forms as well, unless the context clearly indicates otherwise.

It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

As will be appreciated by one of skill in the art, the present invention may be embodied as methods, electronic devices, such as a monitor, and/or data structures. Accordingly, the present invention may take the form of hardware embodiments, software embodiments or embodiments that combine software and hardware aspects.

The present invention is disclosed using (block and flowchart) diagrams. It will be understood that each block (of the flowchart illustration and block diagrams), and combinations of blocks, can be implemented using computer program instructions. These program instructions may be provided to a processor circuit(s) within the electronic device, such that the instructions which execute on the processor circuit(s) create means for implementing the functions specified in the block or blocks.

The computer program instructions may be executed by the processor circuit(s), to cause a series of operational steps to be performed by the processor circuit(s) to produce a computer implemented process such that the instructions which execute on the processor circuit(s) provide steps for implementing the functions specified in the block or blocks. Accordingly, the blocks support combinations of means for performing the specified functions, combinations of steps for performing the specified functions and program instructions for performing the specified functions. It will also be understood that each block, and combinations of blocks, can be implemented by special purpose hardware-based systems which perform the specified functions or steps, or combinations of special purpose hardware and computer instructions.

Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program "code" or instructions for carrying out operations according to the present invention may be written in an object oriented programming language such as JAVA®, or in various other programming languages. Software embodiments of the present invention do not depend on implementation with a particular programming language.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the diagram block or blocks.

Embodiments according to the invention can provide controller circuits that may allow data to be written to a programmable memory in an electronic device. In particular, the controller circuit can be separate from a general operation processor circuit that controls general operations of the electronic device. Furthermore, the controller circuit may allow a transfer of data to the programmable memory without the use of Random Access Memory (RAM) or a Read Only Memory (ROM) that is under the control of the general operation processor circuit. Moreover, in some embodiments according to the invention, the general operation processor circuit can be disabled by the controller circuit while data is transferred (i.e. programmed to) programmable memory. Avoiding the use of RAM and ROM may allow the controller circuit according to embodiments of the invention to be implemented at a lower cost compared to conventional systems.

FIG. 1 is a block diagram that illustrates controller circuit embodiments according to the invention. In particular, a programming system 105 can be used to develop a program that can control some operations or features of an electronic device 100, such as a monitor, a cell phone, a Personal Digital Assistant (PDA), or the like. It will be understood that the programming system 105 is located outside of the electronic device 100 and can be electrically coupled to components described herein without removing a cover or casing that encloses the electronic device 100. The electronic device 100 includes an electronic device operational control circuit 101 that provides a programmable memory 120 in which the program developed using the program system 105 can be stored and subsequently modified during, for example, development of the program used to control operations of the electronic device 100. It will be understood that the programmable memory 120 can be a non-volatile memory device that allows data to be written thereto and retained until erased or re-written with other data such as an EEPROM, Flash Memory, or the like.

In some embodiments according to the invention, the program developed on the programming system 105 is transferred (as data) to the electronic device operational control circuit 101 via an interface, such as an Inter-Integrated Circuit (12C) standard interface. IIC standard interfaces are well known in the art and will not be discussed further In some embodiments according to the invention, the interface can be Video Graphics Adapter (VGA) interface. In some embodiments according to the invention, other types of interfaces, such as a wireless interface, may be used.

The interface is coupled to a general operation processor circuit 110 and a controller circuit 125. The general operation processor circuit 110 can access a programmable memory 120, which can store a program that controls operations and features of the electronic device 100. For example, in some embodiments according to the invention, the general operation processor circuit 110 can access the program (in the programmable memory 120) to provide an on-screen user interface for a monitor.

The controller circuit 125 can transfer the program from the programming system 105 over the interface to the programmable memory 120. In some embodiments according to the invention, the controller circuit 125 disables the general operation processor circuit 110 from accessing the programmable memory 120 while the controller circuit 125 is transferring the program data to the programmable memory 120. Disabling the general operation processor circuit's 110 access to the programmable memory 120 may help avoid access conflicts between the general processor circuit 110 and the controller circuit 125 to the programmable memory 120.

Figure 2:
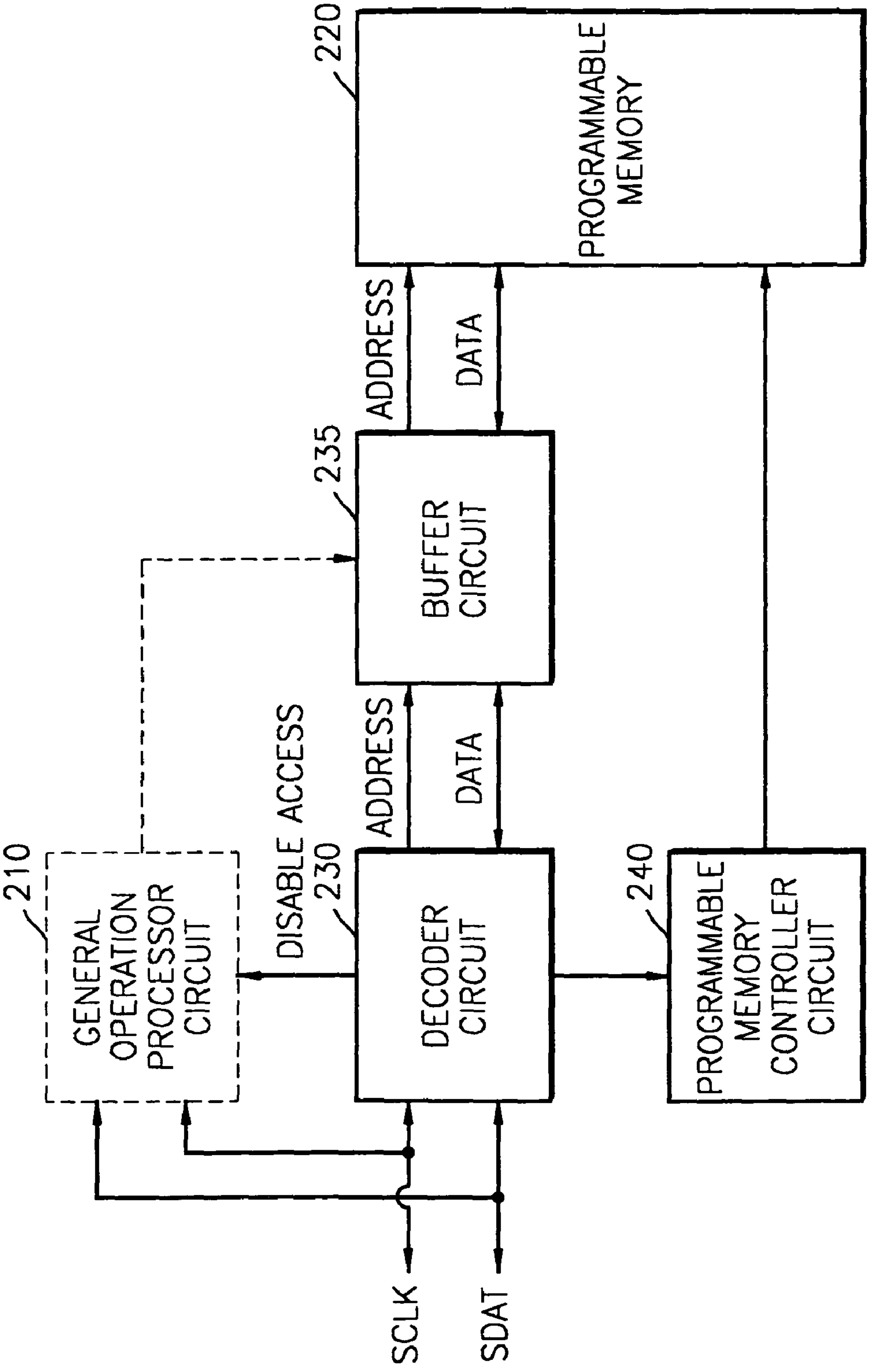

FIG. 2 is a block diagram that illustrates controller circuit embodiments according to the invention. In particular, an electronic device control circuit 225 can include a decoder circuit 230 that is coupled to, for example, an interface over which the program data can be provided by an external programming system. In some embodiments according to the invention, the data is transferred via a Serial Data line (SDA) synchronized by a clock signal Serial Clock line (SCL) included in the interface.

Figure 3:
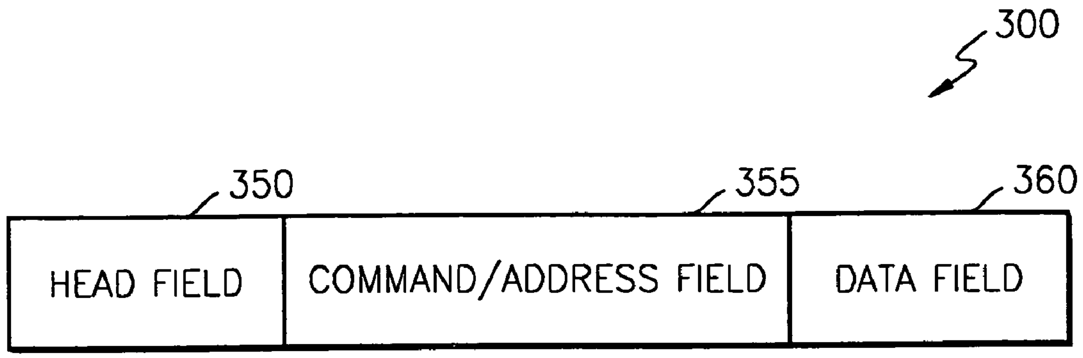
FIG. 3 is a schematic diagram that illustrates data structure embodiments according to the invention.

The program data provided via the interface can be organized according to a data structure illustrated in FIG. 3. In particular, data structures according to embodiments of the invention can include a head field 350 that identifies the remaining fields of the data structure as directed to a programmable memory 220 included in the electronic device operational control circuit 225. For example, the head field 350 can include address information selected to correspond with predetermined addresses reserved within an address range associated with the electronic device control operational control circuit 225. The programming system transmits data to the electronic device control circuit 225 with an address within, for example, an address range that is reserved for the electronic device control circuit 225.

The decoder circuit 230 processes the head field 350 to determine if the information therein includes an address associated with the electronic device operational control circuit 225. If the decoder circuit 230 determines that the head field 350 is directed to the electronic device operational control circuit 225, the decoder circuit processes a command/address field 355 of the data structure associated with the head field 350. The command/address field 355 includes read/write/ erase commands that are to be carried out in the programmable memory 220 and any associated address information.

The read/write/erase command included in the command/address field 355 can operate on data included within a data field 360 in the data structure. For example, if the command/address field 355 includes information indicating that a write command is to be performed, the information included within the data field 360 is written to an address (specified in the command/address field 355) in the programmable memory 220. Furthermore, if the command/address field 355 indicates a read command, the address included therein can be used to read data from the corresponding address of the programmable memory 220. Furthermore, an erase command in the command/address field 355 indicates that at least a portion of the programmable memory is to be erased. It will be understood that the data field 360 can be free of address information. Moreover, the transfer can include a plurality of subsequent data structures following an initial data structure wherein the plurality of subsequent data structures including data to be written to the programmable memory which are free of address and command information.

Referring again to FIG. 2, if the decoder circuit 230 determines that the head field 350 includes information indicating that the data is directed to the programmable memory 220, address and data information (if any) included within the data structure are transferred to a buffer circuit 235 that is coupled to the programmable memory 220. The buffer circuit 235 can be used to organize, for example, data to be written to the programmable memory 220 according to a preferred word or sector size. The buffer circuit 235 can also provide an address interface to the programmable memory 220 so that the appropriate locations in the programmable memory 220 are accessed. It will be understood that the buffer circuit 235 can provide a bi-directional interface so that that data can be provided to and from the programmable memory 220.

The decoder circuit 230 also provides command information included in the data structure to a programmable memory controller circuit 240 based on information included with the command/address field 355. The programmable memory controller circuit 240 provides control signals to the programmable memory 220 to be used in conjunction with the address and/or data provided by the buffer circuit 235 to the programmable memory 220. Accordingly, the address, data, and control signals can perform the transfer of program data from the interface to the programmable memory 220. In some embodiments according to the invention, a read can be performed subsequent to a write to verify that program data was correctly stored within the programmable memory 220.

It will be understood that a general operation processor circuit 210 can also be coupled to the interface. The general operation processor circuit 210 can access the programmable memory 120 via the buffer circuit 235 so that a program stored in the programmable memory 220 can be run by the general operation processor circuit 210. For example, in some embodiments according to the invention, the general operation processor circuit 210 can access a program in the programmable memory 220 to provide an on-screen user interface for a monitor that can be used to customize operations of the monitor. It will be understood that the general operation processor circuit 210 may be coupled to RAM and ROM (not shown) which the general operation processor circuit 210 can access to conduct other operations of the electronic device.

The decoder circuit 230 can disable the general operation processor circuit 210 from accessing the programmable memory 220 while the transfer to the programmable memory 220 is being carried out. The decoder circuit 230 can prevent the general operation processor circuit 210 from accessing the programmable memory 220 in response to determining that data received over the interface is directed to the programmable memory 220. Once the transfer is complete, the decoder circuit 230 can re-enable the general operation processor circuit 210, thereby allowing the general operation processor circuit 210 to access the programmable memory 220 and begin operations specified under control of the program stored therein.

Figure 4:
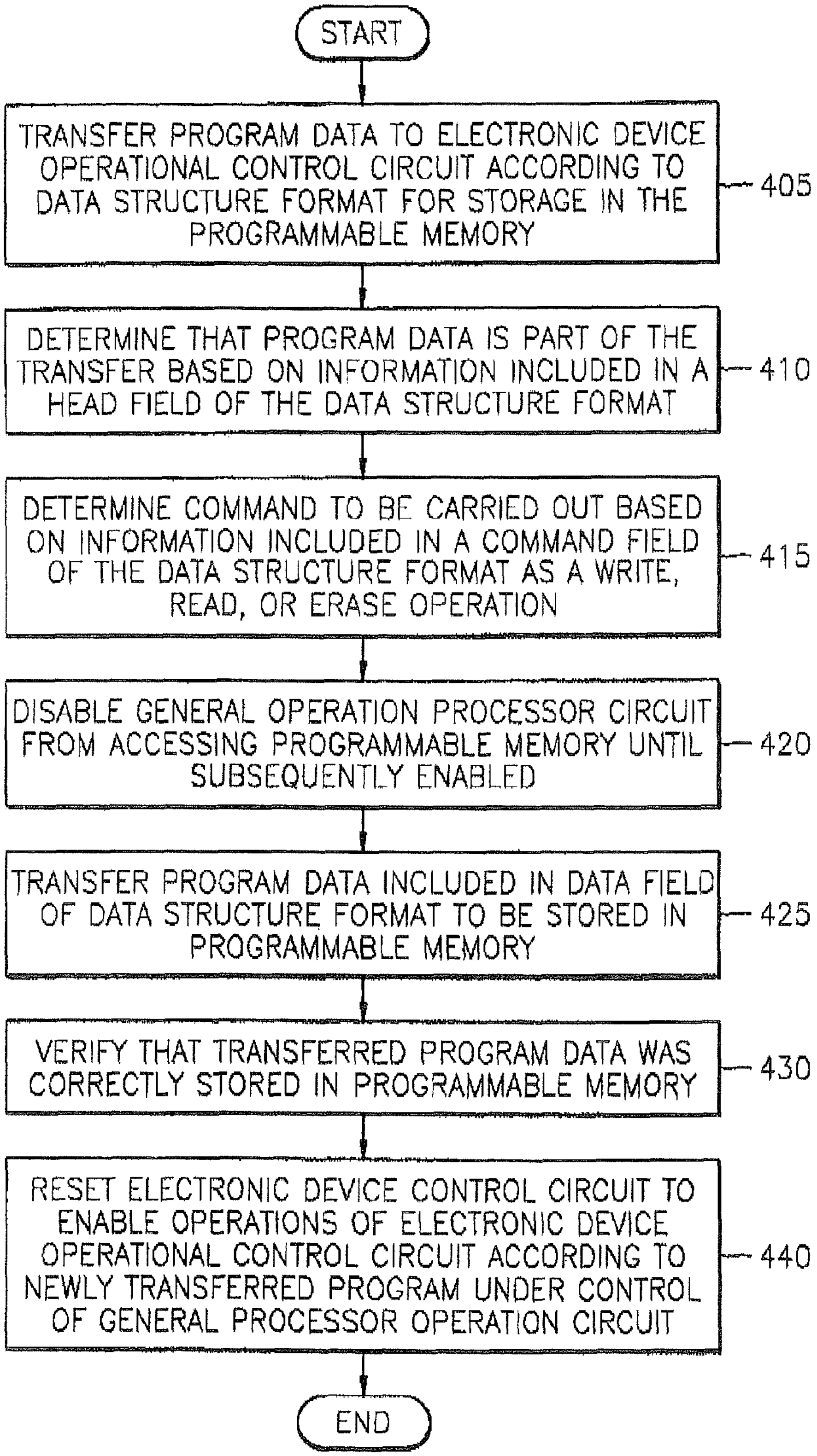
FIG. 4 is a flowchart that illustrates operations of method embodiments according to the invention.

FIG. 4 is a flowchart that illustrates operations of method embodiments according to the invention. As shown in FIG. 4, data to be stored in the programmable memory is transferred to the electronic device according to a data structure format as described herein (block 405). A determination is made that the received data is associated with the transfer based on information included within a head field of the data structure (Block 410). A determination is made as to a command type included within a command/address field of the data structure format (Block 415). In particular, the command type included within the command/address field in the data structure specifies the operation to be performed to the programmable memory as a write operation, a read operation, or an erase operation to be carried out in the programmable memory.

The general operation processor circuit is disabled from accessing the programmable memory until transfer of the data to the programmable memory has been completed (Block 420). Data included within the data field of the data structure is transferred (in the case of a write operation) to the programmable memory (Block 425). A read operation may be performed to determine that the data (Block 425) was correctly written to the programmable memory (Block 430). The electronic device control circuit is reset to enable operations of the electronic device according to the newly transferred program (Block 440).

Embodiments according to the invention can provide controller circuits that may allow data to be written to a programmable memory in an electronic device. In particular, the controller circuit can be separate from a general operation processor circuit that controls general operations of the electronic device. Furthermore, the controller circuit may allow a transfer of data to the programmable memory without the use of Random Access Memory (RAM) or a Read Only Memory (ROM) that is under the control of the general operation processor circuit. Moreover, in some embodiments according to the invention, the general operation processor circuit can be disabled by the controller circuit while data is transferred (i.e. programmed to) programmable memory. Avoiding the use of RAM and ROM may allow the controller circuit according to embodiments of the invention to be implemented at a lower cost compared to conventional systems.

In the drawings and specification, there have been disclosed embodiments according to the invention and, although, specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed:

1. A method of programming an electronic device comprising:

transferring data information and address information included in program data provided from outside the electronic device to a buffer circuit coupled to a programmable memory in the electronic device without using Random Access Memory (RAM) and Read Only Memory (ROM) devices that are separate from a programmable memory controller circuit, wherein the programmable memory controller circuit controls programming of the programmable memory in the electronic device that is separate from a general operation processor circuit used to provide general operations of the electronic device subsequent to transferring data information into the programmable memory;

transferring command information only to the programmable memory controller circuit, wherein the programmable memory controller circuit receives only command information, wherein command information is used to generate control signals used in conjunction with data information and address information transferred to the buffer circuit, wherein the control signals are only generated by the programmable memory controller circuit;

decoding addresses received without passing through the general operation processor circuit, to determine that data information transferred to the buffer circuit is directed to the programmable memory mapped address information transferred to the buffer circuit;

asserting a signal to the general operation processor circuit, responsive to decoding the programmable memory mapped address by the programmable memory controller circuit, to prevent the general operation processor circuit from accessing the programmable memory during transfer of data information into the programmable memory;

transmitting an indication to outside the electronic device that the transfer of data information to the programmable memory is complete; and then de-asserting the signal to the general operation processor circuit to allow the general operation processor circuit to access the programmable memory.

2. The method according to claim 1 wherein the RAM and ROM operate under control of the general operation processor circuit and not under the control of the controller circuit.

3. The method according to claim 1 wherein the step of transferring the program data further comprises transferring the program data via a Video Graphics Adapter (VGA) interface to the electronic device.

4. The method according to claim 1 wherein the step of transferring the program data further comprises transferring the program data via an Inter-Integrated Circuit interface to the electronic device.

5. The method according to claim 1 wherein the general operation processor circuit accesses separate RAM and ROM to provide general operations of the electronic device.

6. The method according to claim 1 further comprising:

transmitting a reset to the controller circuit to enable the general operation processor circuit to access the program data transferred into the programmable memory.

7. The method according to claim 1 wherein the step of transferring the program data further comprises transferring the program data via a Serial Interface to the electronic device.

8. The method according to claim 1 further comprising:

cycling power provided to the controller circuit to reset the controller circuit to enable the general operation processor circuit to access the program data transferred into the programmable memory.

9. The method according to claim 1 wherein the buffer circuit comprises a programmable memory word or sector sized buffer circuit.

10. A circuit for programming a monitor comprising:

a controller circuit configured to transfer program data from outside the monitor to a programmable memory in the monitor without using Random Access Memory (RAM) and Read Only Memory (ROM) devices that are separate from the controller circuit, the controller circuit being separate from a general operation processor circuit used to provide general operations of the monitor subsequent to transferring the program data into the programmable memory, the controller circuit being configured to transmit an indication to outside the electronic device that the transfer of program data to the programmable memory is complete;

transferring command information only to the controller circuit, wherein the controller circuit receives only command information;

a decoder circuit coupled to an interface via which the program data is transferred to the monitor, the decoder circuit configured to provide a first signal responsive to determining that data received via the interface includes an address within a programmable memory mapped address range and data to be programmed as specified in a head field and a command/address field data structure received by the decoder circuit without passing through the general operation processor circuit, the decoder circuit being further configured to assert a signal to the general operation processor circuit, responsive to decoding the programmable memory mapped address, to prevent the general operation processor circuit from accessing the programmable memory during transfer of program data into the programmable memory and configured to then de-assert the signal to the general operation processor circuit to allow the general operation processor circuit to access the programmable memory after the transfer of the program data to the programmable memory is complete; and a buffer circuit coupled to the decoder circuit and the programmable memory and configured to store data provided to/from the programmable memory.

11. The circuit according to claim 10 wherein the buffer circuit comprises a programmable memory word or sector sized buffer circuit configured to store word or sector amounts of data.

* * * * *